United States Patent
Wolk et al.

(10) Patent No.: US 11,473,481 B2
(45) Date of Patent: Oct. 18, 2022

(54) EXHAUST MANIFOLD HAVING TURBINE CONNECTOR WITH TURBINE FOOT

(71) Applicant: Caterpillar Inc., Peoria, IL (US)

(72) Inventors: Matthew Wolk, Peoria, IL (US); Thomas Lee Atwell, Maryville, TN (US); Vikas Bhupendra Sheth, Edwards, IL (US); Jeremy Ross Conyers, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/100,006

(22) Filed: Nov. 20, 2020

(65) Prior Publication Data

US 2022/0162978 A1     May 26, 2022

(51) Int. Cl.
*F01N 13/10*     (2010.01)
*F02B 37/02*     (2006.01)

(52) U.S. Cl.
CPC ............ *F01N 13/105* (2013.01); *F02B 37/02* (2013.01); *F05D 2220/40* (2013.01); *F05D 2240/91* (2013.01)

(58) Field of Classification Search
CPC ...... F01N 13/10; F01N 13/107; F01N 13/105; F01N 2340/04; F01N 2340/06; F05D 2220/40; F05D 2240/91; F02B 37/001; F02B 37/02; F02B 37/025
USPC ................................................ 60/323, 605.1
See application file for complete search history.

(56) References Cited

U.S. PATENT DOCUMENTS

| | | | |
|---|---|---|---|
| 4,351,154 A * | 9/1982 | Richter | ................. F01N 13/107 60/605.1 |
| 5,406,795 A | 4/1995 | Raub et al. | |
| 6,709,235 B2 | 3/2004 | Hosny | |
| 6,892,532 B2 | 5/2005 | Bruce et al. | |
| 9,587,549 B2 | 3/2017 | Wagner et al. | |
| 10,371,043 B2 | 8/2019 | Blahovic | |
| 2003/0221426 A1* | 12/2003 | Bruce | ..................... F01N 13/10 60/323 |
| 2006/0131817 A1 | 6/2006 | Kerelchuk | |

FOREIGN PATENT DOCUMENTS

| | | |
|---|---|---|
| DE | 102016205257 A1 | 10/2016 |
| JP | 0239529 B2 | 9/1990 |
| JP | 1047053 A | 2/1998 |
| WO | 2008113924 A2 | 9/2008 |

OTHER PUBLICATIONS

Written Opinion and International Search Report for Int'l. Patent Appln. No. PCT/US2021/055494, dated Feb. 4, 2022 (16 pgs).

* cited by examiner

*Primary Examiner* — Mickey H France
(74) *Attorney, Agent, or Firm* — Brannon Sowers & Cracraft

(57) ABSTRACT

A turbine connector in an engine exhaust manifold includes a turbine foot attached to incoming exhaust conduits. The turbine foot has an outer perimetric edge defining a trapezoidal shape, and inner perimetric edges forming exhaust outlets from the incoming exhaust conduits. The inner perimetric edges have varied perimetric curvatures largest in finite curvature size upon a web extending between the exhaust outlets, and together forming an hourglass web profile in a turbine-mounting plane defined by the turbine foot.

19 Claims, 2 Drawing Sheets

EXHAUST MANIFOLD HAVING TURBINE CONNECTOR WITH TURBINE FOOT

TECHNICAL FIELD

The present disclosure relates generally to a turbine connector for an engine exhaust manifold, and more particularly to a turbine foot shaped to resist cracking, facilitate installation, and optimize exhaust flow to a turbine in an exhaust system.

BACKGROUND

Many modern internal combustion engines employ one or more turbochargers to extract energy from engine exhaust and use the energy to increase a pressure of intake air. In a typical configuration a turbocharger is mounted to an engine exhaust manifold which collects flows of exhaust from combustion cylinders in the engine and feeds combined flows of the exhaust to an inlet of a turbine in the turbocharger. The flow of exhaust through the turbine impinges upon vanes of the turbine inducing the turbine to rotate. A shaft of the turbine extends to a compressor wheel positioned fluidly in an incoming flow of intake air for the engine or sometimes intake air and fumigated fuel and/or recirculated exhaust. Rotation of the compressor wheel increases a pressure of the intake air enabling the associated internal combustion engine to operate with an increased power, increased power density, and/or improved efficiency based on the extraction of exhaust energy that would otherwise be wasted.

The operating environment of a typical turbocharger is quite harsh as the turbocharger itself as well as associated components can be subjected to extreme temperatures, temperature swings, high absolute pressures, corrosive fluids, and an overall dynamic mechanical environment. For these reasons, turbochargers, exhaust manifolds, and associated equipment are commonly built to be quite robust. As noted above, an engine exhaust manifold generally collects the exhaust from multiple cylinders and provides a feed of combined flows of exhaust to the turbocharger. A desire to limit disruption, perturbation, or so-called "cross-talk" in exhaust flows caused by the dynamic and rapidly changing pressures cylinder-to-cylinder has led many manufacturers to design the exhaust feed to the turbine in a manner where the exhaust flows from some of the cylinders are divided from exhaust flows from other cylinders at least up to the point at which the exhaust enters the turbine housing. Such a construction requires a dividing wall or web separating exhaust flows at the point where the exhaust flows exit the exhaust manifold and enter the turbine housing. Relatively thin metal dividing walls in exhaust manifold castings can experience stress and potentially thermal fatigue earlier in the service life of an engine than desired. One known exhaust system having a low-stress exhaust manifold flange is set forth in U.S. Pat. No. 6,892,532 to Bruce et al. Bruce et al. propose an exhaust system where an exhaust flange is connected to an exhaust manifold, and a turbocharger connected to the exhaust flange. The turbocharger has an exhaust inlet flange connected to the exhaust flange. Exhaust ports of the exhaust flange each have a generally triangular cross-sectional configuration.

SUMMARY OF THE INVENTION

In one aspect, a turbine connector for an engine exhaust manifold includes a first incoming exhaust conduit and a second incoming exhaust conduit. The turbine connector further includes a turbine foot attached to the first incoming exhaust conduit and to the second incoming exhaust conduit. The turbine foot includes an engine-facing side, and a turbine-mounting side opposite to the engine-facing side and including a land defining a turbine-mounting plane. The turbine foot further includes an outer edge having a long perimetric base, a short perimetric base, and a first perimetric leg and a second perimetric leg each extending angularly between the long perimetric base and the short perimetric base. The turbine foot further includes a first inner edge forming a first exhaust outlet from the first incoming exhaust conduit opening in the land, a second inner edge forming a second exhaust outlet from the second incoming exhaust conduit opening in the land, and a web extending between the first exhaust outlet and the second exhaust outlet. The first inner edge and the second inner edge each have a varied perimetric curvature that is largest in finite curvature size upon the web, and together forming an hourglass web profile in the turbine-mounting plane.

In another aspect, an engine exhaust manifold includes a first exhaust pipe structured to fluidly connect to a first set of engine cylinders, and a second exhaust pipe structured to fluidly connect to a second set of engine cylinders. The engine exhaust manifold further includes a turbine connector coupled to the first exhaust pipe and to the second exhaust pipe and including a turbine foot. The turbine foot has an outer perimetric edge defining a trapezoidal shape, a first inner perimetric edge, and a second inner perimetric edge. The first inner perimetric edge forms a first exhaust outlet for feeding exhaust from the first set of engine cylinders to a turbine, and the second inner perimetric edge forms a second exhaust outlet for feeding exhaust from the second set of engine cylinders to the turbine. The turbine foot further includes a web extending between the first exhaust outlet and the second exhaust outlet. The first exhaust outlet and the second exhaust outlet are mirror images of one another, and each has a varied inside curvature that is largest in finite curvature size upon the web.

In still another aspect, a turbine connector for an engine exhaust manifold includes a first incoming exhaust conduit and a second incoming exhaust conduit. The turbine connector further includes a turbine foot attached to the first incoming exhaust conduit and to the second incoming exhaust conduit, and having an engine-facing side, and a turbine-mounting side opposite to the engine-facing side and including a land defining a turbine-mounting plane. The turbine foot further includes an outer edge defining a trapezoidal shape, and having therein a plurality of bolt holes extending between the engine-facing side and the turbine-mounting side and arranged in a trapezoidal pattern congruent with the trapezoidal shape. The turbine foot further includes a first inner edge forming a first exhaust outlet from the first incoming exhaust conduit opening in the land, a second inner edge forming a second exhaust outlet from the second incoming exhaust conduit opening in the land, and a web extending between the first exhaust outlet and the second exhaust outlet. The first inner edge and the second inner edge each have a varied perimetric curvature and together form an hourglass web profile in the turbine-mounting plane.

DETAILED DESCRIPTION

Figure 1:
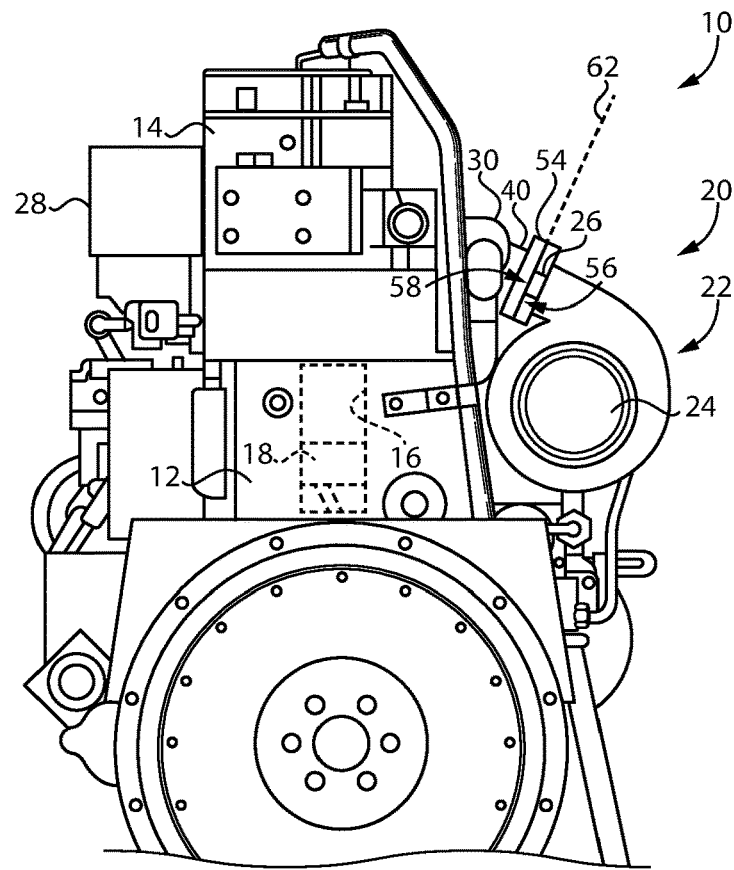
FIG. 1 is a diagrammatic end view of an internal combustion engine system, according to one embodiment.

Referring to FIG. 1, there is shown an internal combustion engine system 10, according to one embodiment. Internal combustion engine system 10 includes a cylinder block 12 and an engine head 14 mounted to cylinder block 12. An engine cylinder or combustion cylinder 16 is shown formed in cylinder block 12 and a piston 18 positioned within combustion cylinder 16 and movable between a top-dead-center (TDC) position and a bottom-dead-center BDC position in a generally conventional manner to rotate a crankshaft. Combustion cylinder 16 may be one of a plurality of combustion cylinders in any suitable arrangement, such as a V-pattern, an inline pattern, or still another. Internal combustion engine system 10 may include a four-stroke, directly-injected, liquid fuel, compression-ignition engine; however, the present disclosure is not thereby limited and internal combustion engine system 10 could be spark-ignited, a gaseous fuel, gasoline, or dual fuel engine system, operate in a two-stroke cycle, or vary in still other ways.

Internal combustion engine system 10 further includes an exhaust system 20 including a turbocharger 22 having a turbine 24 and a turbine inlet 26. Exhaust system 20 also includes an engine exhaust manifold 30 structured to collect exhaust from a plurality of combustion cylinders formed in cylinder block 12. In a practical implementation, exhaust system 20 may further include aftertreatment apparatus (not shown) structured to receive a flow of exhaust from turbine 24 and treat the exhaust to reduce certain emissions in a generally conventional manner. An intake manifold is shown at 28 and is structured to receive a flow of intake air for feeding to the respective combustion cylinders from a compressor (not shown) of turbocharger 22.

Figure 2:
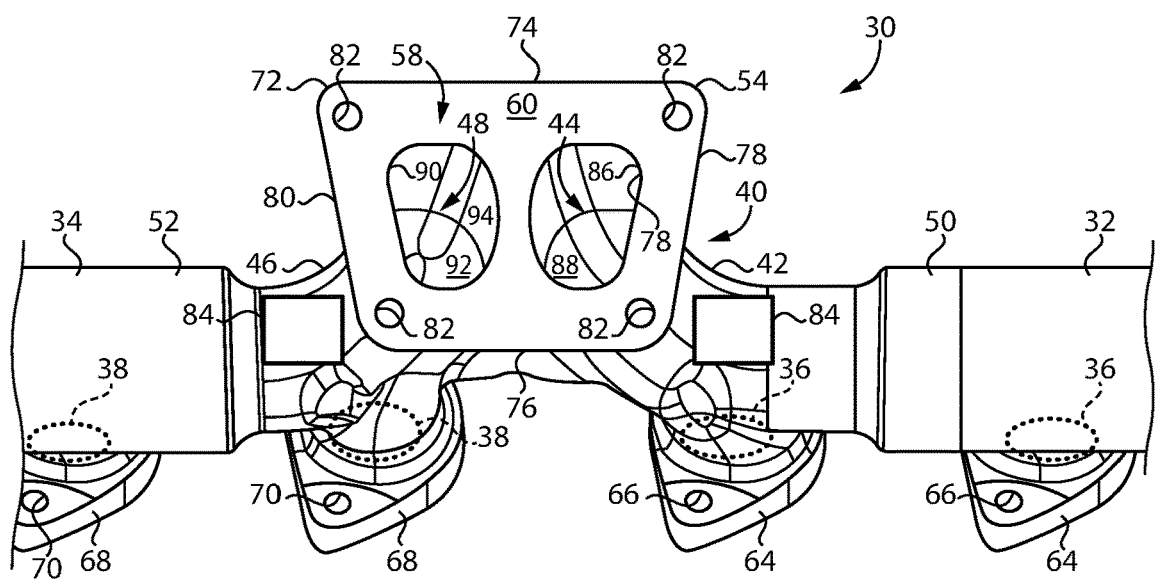
FIG. 2 is a diagrammatic view of an engine exhaust manifold, according to one embodiment.

Referring also now to FIG. 2, engine exhaust manifold 30 may include a body 41 having a first exhaust pipe 32 and a second exhaust pipe 34. First exhaust pipe 32 may receive exhaust from a first set of cylinders in cylinder block 12, for example three cylinders or four cylinders, and second exhaust pipe 34 may receive exhaust from a second set of cylinders in cylinder block 12, for example three cylinders or four cylinders. Body 41 may be in its entirety a one-piece casting but could alternatively include multiple pieces attached together such as by welding. Engine exhaust manifold 30 further includes a turbine connector 40 having a first incoming exhaust conduit 42 forming a first exhaust passage 44 and fluidly connected to first exhaust pipe 32. Turbine connector 40 also includes a second incoming exhaust conduit 46 forming a second exhaust passage 48 and fluidly connected to second incoming exhaust pipe 34.

In the illustration of FIG. 2 a plurality of pipe feet 64 are attached to first exhaust pipe 32 and/or first incoming exhaust conduit 42, and a second plurality of pipe feet 68 are attached to second exhaust pipe 34 and/or second incoming exhaust conduit 46. A number in total of the respective pipe feet may correspond to a number in total of combustion cylinders formed in cylinder block 12. Bolt holes 66 are shown formed in pipe feet 64 and bolt holes 70 are shown formed in pipe feet 68, for bolting to cylinder block 12. Additional bolt holes in the respective pipe feet located generally opposite the illustrated bolt holes may be provided and are obscured from view in the illustration of FIG. 2. Also as shown in FIG. 2, a first fitting 50 may connect first exhaust pipe 32 to first incoming exhaust conduit 42, and a second fitting 52 may connect second exhaust pipe 34 to second incoming exhaust conduit 46. It will be recalled that engine exhaust manifold 30 might be a single piece body, where multiple attached pieces and fittings as such may or may not be part of the design. Exhaust inlets 36 and 38 are formed in the respective exhaust pipes and/or exhaust conduits to feed exhaust from engine cylinders into exhaust pipes 32 and 34 and into the respective exhaust passages 44 and 48.

Turbine connector 40 further includes a turbine foot 54 attached to first incoming exhaust conduit 42 and to second incoming exhaust conduit 46. Turbine foot 54 includes an engine-facing side 56, and a turbine-mounting side 58 opposite to engine-facing side 56 and including a land 60 defining a turbine-mounting plane 62. In a practical implementation, a gasket, one or more metallic seal, or similar element(s) is sandwiched between turbine foot 54 and turbocharger 22 when turbocharger 22 is installed for service in internal combustion engine system 10.

Turbine foot 54 further includes a continuous outer perimetric edge 72 (hereinafter "outer edge 72"). Outer edge 72 has a long perimetric base 74, a short perimetric base 76, and a first perimetric leg 78 and a second perimetric leg 80 each extending angularly between long perimetric base 74 and short perimetric base 76. It can be seen that in the illustrated embodiment long perimetric base 74, short perimetric base 76, first perimetric leg 78, and second perimetric leg 80, together define a trapezoidal shape. Also in the illustrated embodiment, the trapezoidal shape is an isosceles trapezoid. A trapezoidal shape, or other shapes where perimetric legs extend angularly between a long base and a short base, can provide for an optimized size, land area, and flow area for exhaust as further discussed herein, and can assist in assembly operations of internal combustion engine system 10. FIG. 2 also depicts obstructions 84 upon opposite left and right sides of turbine foot 54. During assembly or servicing of exhaust system 20 in internal combustion engine system 10 there may be certain components including housing components, conduits, electrical components, temperature management components, or a variety of others that are installed or to be installed in such a way that other shapes to a turbine foot such as a square shape, a rectangular shape, or a curved shape, could physically interfere with or come close to physically interfering with such obstructions, or otherwise complicate or slow assembly. The disclosed turbine foot shape, including the perimetric shape defined by outer edge 72 can ease and hasten assembly by providing for efficient packaging and suitable clearances between turbine foot 54 and obstructions 84, for example. It can also be seen from FIG. 2 that a plurality of bolt holes 84 are formed in turbine foot 54 and extend between engine-facing side 56 and turbine-mounting side 58. Bolt holes 84 are arranged in a trapezoidal pattern congruent with the trapezoidal shape defined by outer edge 72.

Figure 3:
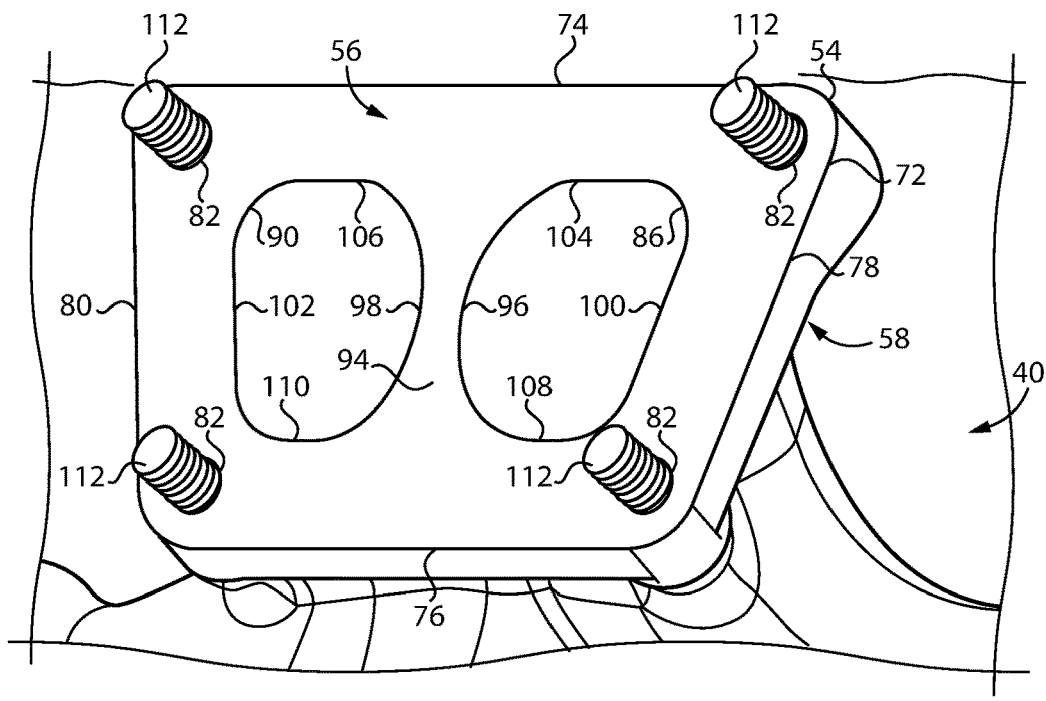
FIG. 3 is a diagrammatic view of a portion of a turbine connector for an engine exhaust manifold, according to one embodiment.
Figure 4:
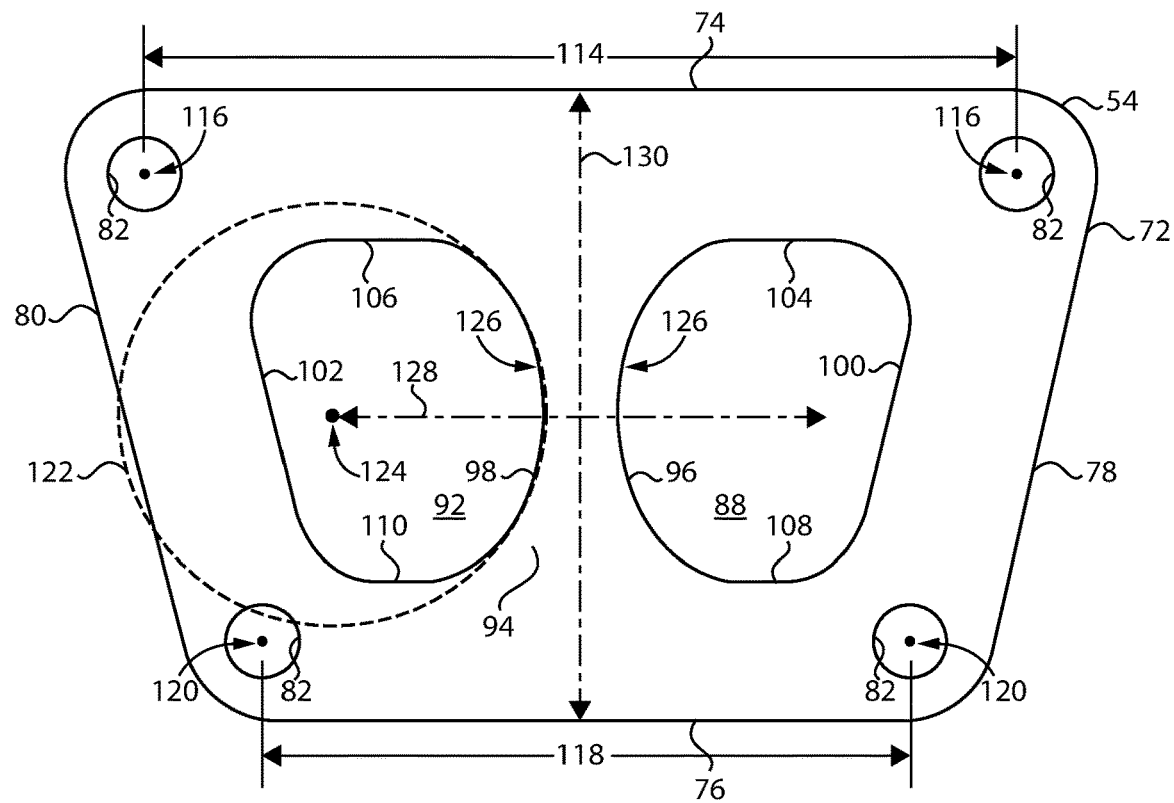
FIG. 4 is an elevational view of a turbine foot, according to one embodiment.

Referring also now to FIG. 3, there are shown threaded stud bolts 112 positioned in and extending from bolt holes 82. Stud bolts 112 may be received in registering bolt holes in turbocharger 22, coupled with threaded nuts, and a gasket and/or seal sandwiched therebetween. Referring also now to FIG. 4, turbine foot 54 further includes a first inner perimetric edge 86 (hereinafter "first inner edge 86") forming a first exhaust outlet 88 from first incoming exhaust conduit 42 opening in land 60 and structured to feed exhaust from a first set of engine cylinders to turbine 24. Turbine foot 54 also includes a second inner perimetric edge 90 (hereinafter "second inner edge 90") forming a second exhaust outlet 92 from second incoming exhaust conduit 46 opening in land 60 and structured to feed exhaust from a second set of engine cylinders to turbine 24. Land 60 thus surrounds first exhaust outlet 88 and second exhaust outlet 92.

Turbine foot 54 still further includes a web 94 extending between first exhaust outlet 88 and second exhaust outlet 92, dividing turbine foot 54, and separating flows of exhaust from respective sets of combustion cylinders that are fed into turbine inlet 26 of turbocharger 22. First inner edge 86 and second inner edge 90 each have a varied perimetric curvature that is largest in finite curvature size upon web 94. Largest in finite curvature refers to the curvatures that are largest, relative to other curvatures of inner edges 86 and 90, and not infinite as might be defined by a linear or substantially linear edge segment. Stated another way nowhere is a finite curvature of inner edges 86 and 90 larger than upon web 94.

First inner edge 86 and second inner edge 90 together form an hourglass web profile in turbine mounting plane 62. It will be understood that turbine-mounting plane 62 is a plane of the page in FIG. 4, with the hourglass profile thus being readily apparent. As also shown in the Figures, first exhaust outlet 88 and second exhaust outlet 92 may be mirror images of one another. It can further be seen from FIG. 4 that the hourglass web profile defines a major axis 128, and a minor axis 130 normal to long perimetric base 74 and to short perimetric base 76. Minor axis 130 can be understood to bisect the isosceles trapezoid shape defined by outer edge 72 discussed above, with first exhaust outlet 88 and second exhaust outlet 92 being mirror images of one another in opposite halves of the bisected isosceles trapezoid. The terms minor axis and major axis are used herein in a manner analogous to the usage of such terms in connection with a hyperbola. The hourglass shape may be a hyperbolic shape formed by parabolic curves but will typically be an hourglass shape formed by circular arc segments.

Each of first inner edge 86 and second inner edge 90 may include a curved perimeter segment 96 and 98, respectively, upon web 94, and having the largest finite curvature noted above, at least in turbine-mounting plane 62. Each curved perimeter segment 96 and 98 may also thus form a circular arc segment. Each of first inner edge 88 and second inner edge 90 may further include a linear perimeter segment 100 and 102, respectively, opposite to the respective curved perimeter segments 96 and 98 and oriented parallel to an adjacent one of first perimetric leg 78 and second perimetric leg 80. Each of first inner edge 86 and second inner edge 90 may further include another linear perimeter segment 104 and 106, respectively, adjacent to long perimetric base 74, and still another linear perimeter segment 108 and 110, respectively, adjacent to short perimetric base 76.

With continued reference to FIG. 4, bolt holes 82 may include two long-span bolt holes 82 adjacent to long perimetric base 74, and two short-span bolt holes 82 adjacent to short perimetric base 76. A long-span dimension 114 is defined between centerlines 116 of the respective two long-span bolt holes 82. A short-span dimension 118 is defined between centerlines 120 of the respective two short-span bolt holes 82. It will be recalled that curved perimeter segments 96 and 98 may each form a circular arc segment. It will also be recalled that exhaust outlets 88 and 92 may be mirror images of one another, hence, description or discussion of one of exhaust outlets 88 and 92 herein is understood to refer by way of analogy to the other. Curved perimeter segment 98 defines a radius 126 of a circle 122, of which curved perimeter segment 98 forms a circular arc segment. Circle 122 has a centerpoint 124 relatively closer to linear perimeter segment 102 than to curved perimeter segment 98 in a left-right direction as shown in FIG. 4. Radius 126 may have a size dimension. By fitting together perimetric segments of certain relative sizes, and relative to other geometric attributes of turbine foot 54, factors including exhaust outlet size and flow area, web cracking resistance, and exhaust system assembly and installation facilitation are balanced and optimized, as further discussed herein.

To this end, a ratio of the radius size dimension defined by radius 126 to long-span dimension 114 may be less than 32% or 0.32:1, and a ratio of the subject radius size dimension to short-span dimension 118 may be greater than 32% or 0.32:1. In a refinement, the ratio of the subject radius size dimension to long-span dimension 114 may be about 28% or 0.28:1, and the ratio of the subject radius size dimension to short-span dimension 118 may be about 36% or 0.36:1. A ratio of short-span dimension 118 to long-span dimension 114 may be from 75% or 0.75:1 to 80% or 0.80:1, and in a refinement may be from about 77% or 0.77:1 to about 78% or 0:78:1. Also in a practical implementation, first exhaust outlet 88 and second exhaust outlet 92 together define a flow area, land 60 also defines a land area, and a ratio of the flow area to the land area may be from 44% or 0.44:1 to 54% or 0.54:1. In a refinement the ratio of the flow area to the land area may be from about 48% or 0.48:1 to about 50% or 0.50:1. As used herein the term "about" can be understood in the context of conventional rounding to a consistent number of significant digits. Accordingly, "about 0.48" means from 0.475 to 0.484, and so on.

INDUSTRIAL APPLICABILITY

As discussed above, the general shape formed by turbine foot 54, which may be an isosceles trapezoid shape, for example, can assist in assembly and installation of turbocharger 22 in exhaust system 20, and also provides a relatively large land area within which exhaust outlet areas can be made relatively large without requiring outside walls of turbine foot 54 or web 94 to be made unduly thin or sharply radiused to the point of promoting thermal-fatigue cracking or causing other problems. The inner peripheral shapes and proportional attributes of inner edge 86 and inner edge 90 can thus be understood to provide optimized shape and flow area in conjunction with the outer peripheral shape of turbine foot 54 itself. Put differently, exhaust outlets 88 and 92 provide an optimized flow area that fits within a trapezoidal or similar shape while still providing a web thickness and size and wall thicknesses sufficient to be relatively crack-resistant in response to thermal cycling or the like over the course of an engine service life or service interval. The hourglass divider wall as disclosed herein, and other geometric and proportional attributes thus provide robustness and optimized flow area to the inlet assembly on the exhaust manifold side, while the trapezoidal or otherwise analogously shaped foot facilitates easy assembly and installation of the exhaust manifold and turbine, ultimately reducing overall production time.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A turbine connector for an engine exhaust manifold comprising:
   a first incoming exhaust conduit;
   a second incoming exhaust conduit;
   a turbine foot attached to the first incoming exhaust conduit and to the second incoming exhaust conduit, and having an engine-facing side, and a turbine-mounting side opposite to the engine-facing side and including a land defining a turbine-mounting plane;
   the turbine foot further including an outer edge having a long perimetric base, a short perimetric base, and a first perimetric leg and a second perimetric leg each extending angularly between the long perimetric base and the short perimetric base, wherein the long perimetric base, the short perimetric base, the first perimetric leg, and the second perimetric leg, together define a trapezoidal shape;
   the turbine foot further including a first inner edge forming a first exhaust outlet from the first incoming exhaust conduit opening in the land, a second inner edge forming a second exhaust outlet from the second incoming exhaust conduit opening in the land, and a web extending between the first exhaust outlet and the second exhaust outlet; and
   the first inner edge and the second inner edge each having a varied perimetric curvature that is largest in finite curvature size upon the web, and together forming an hourglass web profile in the turbine-mounting plane.

2. The turbine connector of claim 1 wherein:
   the trapezoidal shape is an isosceles trapezoid;
   the hourglass web profile defines a major axis, and a minor axis normal to the long perimetric base and to the short perimetric base; and
   the minor axis bisects the isosceles trapezoid, and the first exhaust outlet and the second exhaust outlet are mirror images of one another upon opposite sides of the isosceles trapezoid.

3. The turbine connector of claim 1 wherein each of the first inner edge and the second inner edge includes a curved perimeter segment upon the web, and a linear perimeter segment opposite to the respective curved perimeter segment and oriented parallel to an adjacent one of the first perimetric leg or the second perimetric leg.

4. The turbine connector of claim 3 wherein each of the first inner edge and the second inner edge includes a linear perimeter segment adjacent to the long perimetric base, and a linear perimeter segment adjacent to the short perimetric base.

5. The turbine connector of claim 3 wherein each of the curved perimeter segments forms a circular arc segment.

6. The turbine connector of claim 3 wherein the turbine foot further includes therein a plurality of bolt holes extending between the engine-facing side and the turbine-mounting side and arranged in a trapezoidal pattern congruent with the trapezoidal shape.

7. The turbine connector of claim 6 wherein:
   the plurality of bolt holes includes two long-span bolt holes adjacent to the long perimetric base, and two short-span bolt holes adjacent to the short perimetric base;
   a long-span dimension is defined between centerlines of the two long-span bolt holes, a short-span dimension is defined between centerlines of the two short-span bolt holes, and a radius size dimension is defined by each of the curved perimeter segments; and
   a ratio of the radius size dimension to the long-span dimension is less than 0.32:1, and a ratio of the radius size dimension to the short-span dimension is greater than 0.32:1.

8. The turbine connector of claim 7 wherein the ratio of the radius size dimension to the long-span dimension is about 0.28:1, and the ratio of the radius size dimension to the short-span dimension is about 0.36:1.

9. The turbine connector of claim 1 wherein the first exhaust outlet and the second exhaust outlet together define a flow area, and the land defines a land area, and a ratio of the flow area to the land area is from 0.44:1 to 0.54:1.

10. The turbine connector of claim 9 wherein the ratio of the flow area to the land area is from about 0.48:1 to about 0.50:1.

11. An engine exhaust manifold comprising:
    a first exhaust pipe structured to fluidly connect to a first set of engine cylinders;
    a second exhaust pipe structured to fluidly connect to a second set of engine cylinders;
    a turbine connector coupled to the first exhaust pipe and to the second exhaust pipe, and including a turbine foot;
    the turbine foot having an outer perimetric edge defining a trapezoidal shape, a first inner perimetric edge, and a second inner perimetric edge;
    the first inner perimetric edge forming a first exhaust outlet for feeding exhaust from the first set of engine cylinders to a turbine, and the second inner perimetric edge forming a second exhaust outlet for feeding exhaust from the second set of engine cylinders to the turbine;
    the turbine foot further including a web extending between the first exhaust outlet and the second exhaust outlet; and
    the first exhaust outlet and the second exhaust outlet are mirror images of one another, and each has a varied inside curvature that is largest in finite curvature size upon the web.

12. The engine exhaust manifold of claim 11 wherein the inside curvatures largest in finite curvature size are circular curvatures formed by curved perimeter segments of the respective inner perimetric edges.

13. The engine exhaust manifold of claim 12 wherein the turbine foot further includes therein a plurality of bolt holes arranged in a trapezoidal pattern congruent with the trapezoidal shape.

14. The engine exhaust manifold of claim 13 wherein the first exhaust outlet and the second exhaust outlet together define a flow area, and the turbine foot further includes a land surrounding the first exhaust outlet and the second exhaust outlet and defining a land area, and a ratio of the flow area to the land area is from 0.44:1 to 0.54:1.

15. The engine exhaust manifold of claim 14 wherein:
    the plurality of bolt holes includes two long-span bolt holes adjacent to the long perimetric base, and two short-span bolt holes adjacent to the short perimetric base;

a long-span dimension is defined between centerlines of the two long-span bolt holes, a short-span dimension is defined between centerlines of the two short-span bolt holes, and a radius size dimension is defined by each of the curved perimeter segments; and a ratio of the radius size dimension to the long-span dimension is less than 0.34:1, and a ratio of the radius size dimension to the short-span dimension is greater than 0.34:1.

16. The engine exhaust manifold of claim 11 wherein the first inner perimetric edge and the second inner perimetric edge together define an hourglass web profile in a turbine-mounting plane defined by the turbine foot.

17. A turbine connector for an engine exhaust manifold comprising:
   a first incoming exhaust conduit;
   a second incoming exhaust conduit;
   a turbine foot attached to the first incoming exhaust conduit and to the second incoming exhaust conduit, and having an engine-facing side, and a turbine-mounting side opposite to the engine-facing side and including a land defining a turbine-mounting plane;
   the turbine foot further including an outer edge defining a trapezoidal shape, and including therein a plurality of bolt holes extending between the engine-facing side and the turbine-mounting side and arranged in a trapezoidal pattern congruent with the trapezoidal shape;
   the turbine foot further including a first inner edge forming a first exhaust outlet from the first incoming exhaust conduit opening in the land, a second inner edge forming a second exhaust outlet from the second incoming exhaust conduit opening in the land, and a web extending between the first exhaust outlet and the second exhaust outlet; and
   the first inner edge and the second inner edge each having a varied perimetric curvature and together forming an hourglass web profile in the turbine-mounting plane.

18. The turbine connector of claim 17 wherein:
   the plurality of bolt holes includes two long-span bolt holes adjacent to the long perimetric base, and two short-span bolt holes adjacent to the short perimetric base;
   a long-span dimension is defined between centerlines of the two long-span bolt holes, and a short-span dimension is defined between centerlines of the two short-span bolt holes; and
   a ratio of the short-span dimension to the long-span dimension is from 0.75:1 to 0.80:1.

19. The turbine connector of claim 18 wherein:
   each of the first inner edge and the second inner edge includes a curved perimeter segment upon the web, and a radius size dimension is defined by each of the curved perimeter segments;
   a ratio of the radius size dimension to the long-span dimension is less than 0.32:1, and a ratio of the radius size dimension to the short-span dimension is greater than 0.32:1; and
   the first exhaust outlet and the second exhaust outlet together define a flow area, and the land defines a land area, and a ratio of the flow area to the land area is from 0.44:1 to 0.54:1.

* * * * *